United States Patent
Furukawa

(10) Patent No.: US 9,505,280 B2
(45) Date of Patent: Nov. 29, 2016

(54) TRAILER HITCH STRUCTURE

(71) Applicant: Fuji Jukogyo Kabushiki Kaisha, Tokyo (JP)

(72) Inventor: Toshiya Furukawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/685,421

(22) Filed: Apr. 13, 2015

(65) Prior Publication Data
US 2015/0321527 A1 Nov. 12, 2015

(30) Foreign Application Priority Data
May 8, 2014 (JP) .................................. 2014-097082

(51) Int. Cl.
| B60D 1/46 | (2006.01) |
| B60D 1/06 | (2006.01) |
| B60D 1/24 | (2006.01) |

(52) U.S. Cl.
CPC ................ *B60D 1/06* (2013.01); *B60D 1/243* (2013.01); *B60D 1/46* (2013.01)

(58) Field of Classification Search
CPC ......... B60D 1/46; B60D 1/243; B60D 1/244
USPC ....................................................... 280/495
See application file for complete search history.

(56) References Cited

U.S. PATENT DOCUMENTS

| 3,843,162 A * | 10/1974 | Abromavage | B60D 1/50 280/486 |
| 3,863,954 A * | 2/1975 | Abromavage | B60D 1/50 280/486 |
| 4,817,978 A * | 4/1989 | James | B60D 1/586 267/138 |
| 6,739,613 B2 * | 5/2004 | Aquinto | B60D 1/485 280/500 |
| 7,527,327 B2 * | 5/2009 | Aghssa | B60D 1/243 296/187.11 |
| 7,971,895 B2 * | 7/2011 | Kozuka | B60D 1/06 280/491.5 |
| 2013/0056959 A1 * | 3/2013 | Mathes | B62D 21/152 280/504 |

FOREIGN PATENT DOCUMENTS

JP 2009-262660 A 11/2009

* cited by examiner

*Primary Examiner* — Anne Marie Boehler
*Assistant Examiner* — Michael Stabley
(74) *Attorney, Agent, or Firm* — McGinn IP Law Group, PLLC.

(57) ABSTRACT

A trailer hitch connected to rear frames has, on each side, a fixed member fixed to a rear end surface of the corresponding rear side frame. The rear surfaces of the fixed plates are connected to each other by a cross member. A hitch support for supporting a hitch ball is provided at the center of the cross member. A front surface upper portion of each of the fixed members is supported by an arm of a fixed bracket fixedly installed to the corresponding rear frame, so as to swing freely in a longitudinal direction.

12 Claims, 9 Drawing Sheets

TRAILER HITCH STRUCTURE

CROSS-REFERENCE TO RELATED APPLICATIONS

The present application claims priority from Japanese Patent Application No. 2014-097082 filed on May 8, 2014, the entire contents of which are hereby incorporated by reference.

BACKGROUND

1. Technical Field

The present invention relates to trailer hitch structures that are capable of efficient absorption of an impact load of a rear end collision.

2. Related Art

A conventional trailer hitch is typically attached to the rear of a vehicle, such as an automobile, to pull a camping trailer, a trailer carrying a small boat, or the like. In most cases, the trailer hitch is connected directly with highly rigid rear side frames (also called "rear side members") that are provided on either side of a vehicle widthwise direction and extend toward the rear of the vehicle body.

Thus, the trailer hitch includes fixed plates on either side that are fixed to rear end surfaces of the rear side frames respectively. The fixed plates are connected to each other by a cross member, and a hitch support arm for supporting a hitch ball is fixed inside the cross member.

In a state in which the fixed plates are fixed to the rear end surfaces of the rear side frames, this hitch support arm is offset downward with respect to the rear side frames and protrudes towards the rear of the vehicle.

Due to this configuration, at a rear end collision of the vehicle, an impact load is applied first to the hitch support arm. Because this hitch support arm is offset downward with respect to the rear side frames, this impact load generates a large bending moment in the fixed plates via the hitch support arm to rotate the fixed plates downward. Due to this moment load, each rear side frame becomes bent and deformed easily at a point in front of the fixed plates. As a result, the rear side frames are prevented from efficiently absorbing the impact.

As a way to deal with this problem, Japanese Unexamined Patent Application Publication (JP-A) No. 2009-262660, for instance, discloses a technique in which a fold promoting member is fixedly installed to a rear end of rear side frames, and a trailer hitch that is fixed to a rear end surface of each rear side frame is provided with an abutting portion that is opposed to a rear of the fold promoting member with a predetermined space therebetween, and a fragile portion is formed in the middle of the side frame by means of beads.

According to the technique disclosed in JP-A No. 2009-262660, at a rear end collision, first the reaction of the fold promoting member bends and deforms the rear side frame at a point closer to the rear end side than the fragile portion, to absorb the impact, and then bends and deforms the rear side frame at a point closer to the front than the fragile portion, to absorb the impact.

According to the technique disclosed in JP-A No. 2009-262660, the fragile portion is formed in the middle of the rear side frame, and the rear side frame is bent and deformed twice, in front of and behind the fragile portion, thereby absorbing the impact of a collision.

However, because the trailer hitch is offset downward with respect to the rear side frame, a longitudinal moment is generated in the trailer hitch at the time of the rear end collision, and consequently the rear side frame is bent and deformed with respect to the fragile portion by this moment load. However, simply bending and deforming the center of the rear side frame is not enough to efficiently absorb the impact load of the rear end collision.

Moreover, because the technique of JP-A No. 2009-262660 is structured to absorb the impact load of the rear end collision by bending and deforming the rear side frames twice in front of and behind the fragile portion, the rear side frame needs to ensure therein a relatively long region to be bent and deformed.

However, in a vehicle, such as an engine/electric hybrid vehicle and an electric vehicle, the center of gravity lowered by having a number of secondary batteries such as lithium ion batteries and nickel hydride batteries installed under the rear floor panel between rear side frames to secure driving performance and the like. Such batteries are solid and relatively heavy parts among the parts configuring the vehicle. Accordingly, a relatively long space for absorbing the impact of a rear end collision cannot be secured in each rear side frame in a manner described in JP-A No. 2009-262660.

SUMMARY OF THE INVENTION

The present invention has been designed in consideration of the circumstances described above, and an object thereof is to provide a trailer hitch structure that is capable of efficient absorption of an impact load upon a rear end collision by means of a short span in a rear of a rear side frame.

An aspect of the present invention provides a trailer hitch structure including a rear frame disposed on each side of a vehicle body in a widthwise direction and extending in a longitudinal direction of the vehicle body, and a trailer hitch that is connected to the rear frames and has a pair of fixed members fixed to the rear frames, a cross member connecting the fixed members to each other, and a hitch support fixed to the cross member. In this trailer hitch structure, a fixed bracket is provided in a rear portion of each of the rear frames in a fixed manner, and the fixed brackets support the respective fixed members in such a manner that the fixed members swing freely in the longitudinal direction of the vehicle body.

DETAILED DESCRIPTION

Figure 1:
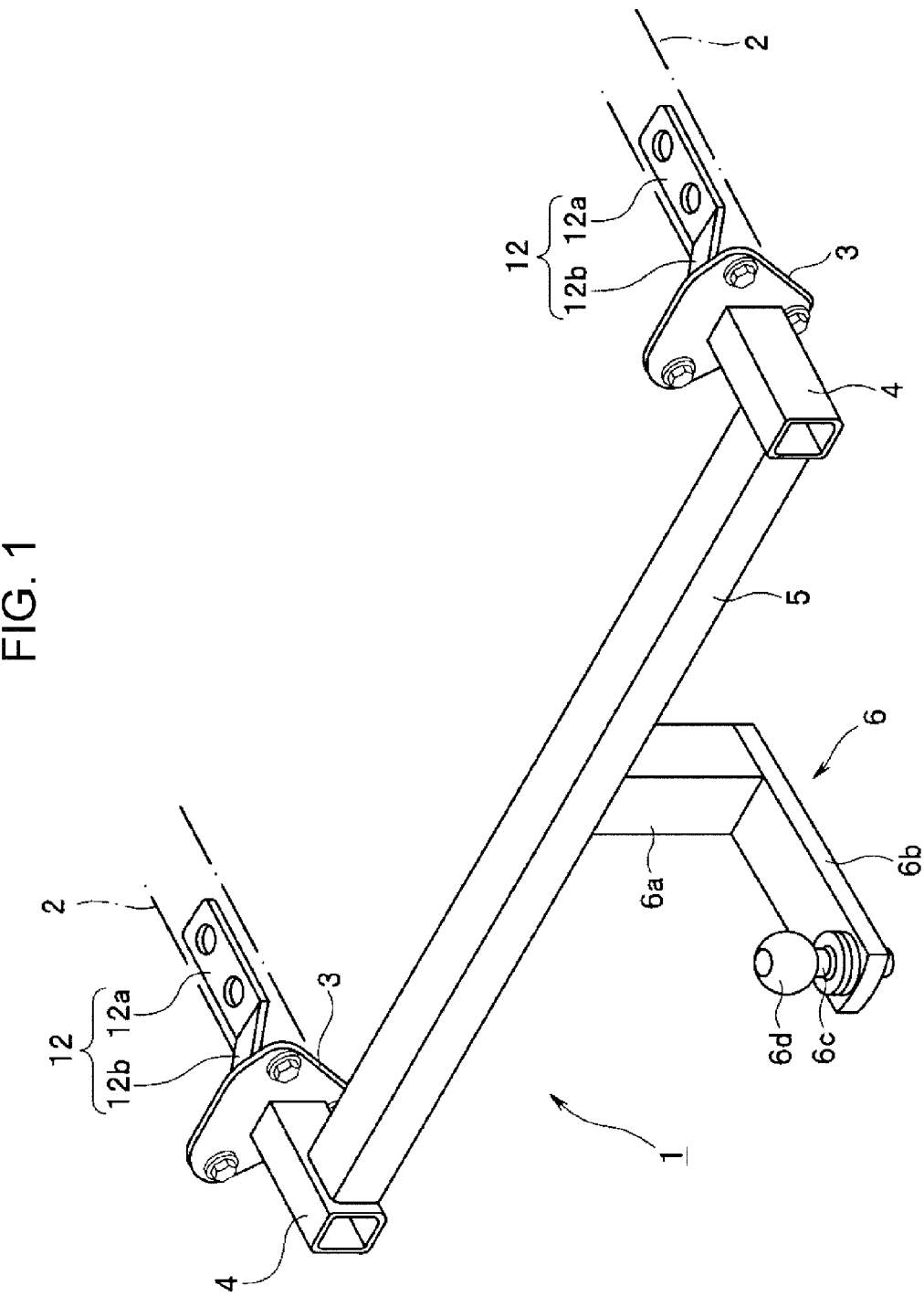
FIG. 1 is a perspective view of a trailer hitch according to a first example.

Examples of the present invention are described hereinafter with reference to the diagrams.

First Example

A first example of the present invention will be described with reference to FIGS. 1 to 4. Reference numeral 1 in the diagrams represents a trailer hitch. In each of the diagrams, the longitudinal and lateral directions of the trailer hitch 1 correspond to the longitudinal and lateral directions of a vehicle body to which the trailer hitch 1 is connected.

Figure 2:
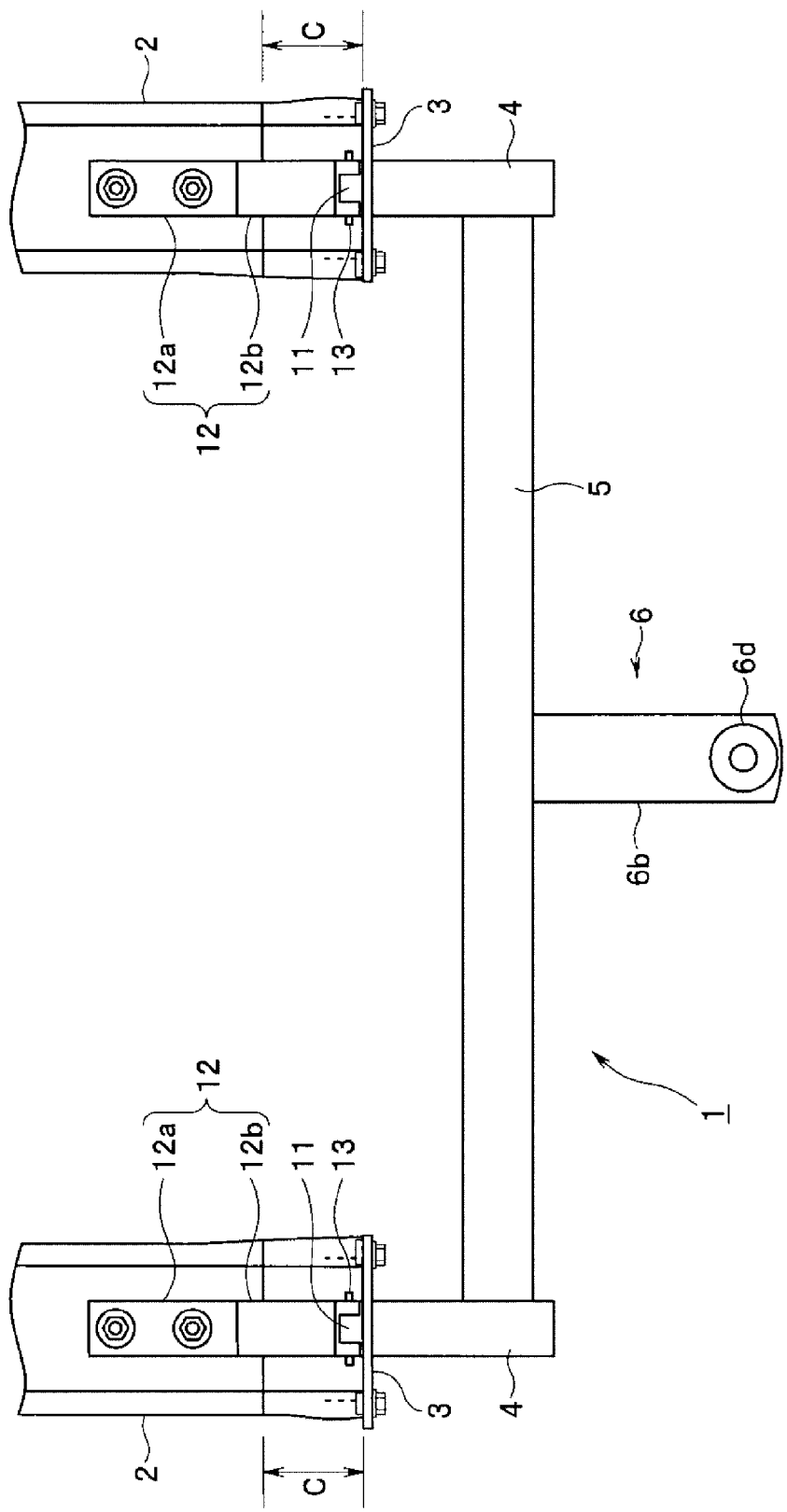
FIG. 2 is a plan view of the trailer hitch.

As illustrated in FIGS. 1 and 2, the trailer hitch 1 is fixedly installed to a rear end surface of a rear side frame 2 provided on each side of the rear of the vehicle body in a vehicle widthwise direction. The rear side frames 2 serves the rear frames of the present invention in the first example. The rear side frames 2 are each configured to have a hat-shaped cross section with an open upper surface, and a rear floor panel (not illustrated) is welded to these upper surfaces. In case of an engine/electric hybrid vehicle or an electric vehicle, electric components including a solid and relatively heavy, battery module are disposed under the rear floor panel between the side frames 2.

An impact absorption (energy absorption (EA)) region C with a predetermined length is set at an axial rear end of each rear side frame 2. At the time of a rear end collision, the EA region C is collapsed (multiple buckling deformations) in the axial direction to absorb an impact load received from the trailer hitch 1. The EA region C may be formed by welding an extension (EA member) to the rear side frame 2 located in front of the EA region C, or may be formed by machining the rear side frame 2 itself. When forming the EA region C by machining the rear side frame 2 itself, a bellow, for instance, is formed extending from a rear end to a front within the EA region C. The bellow has a jagged surface that causes buckling, and this jagged surface is formed of ripples or beads.

The trailer hitch 1, on the other hand, has a fixed plate 3 that is fastened and fixed to a bent flange formed at a rear end surface of each rear side frame 2, and support brackets 4 are provided in a protruding manner on rear surfaces of the fixed plates 3. The fixed plates 3 and the support brackets 4 serve the fixed members of the present invention in the first example.

The support brackets 4 are each formed into a cylinder having a rectangular cross section and are connected to each other by a cross member 5. A hitch ball support 6 that serves as a hitch support of the present invention in the first example is fixedly installed to the center of the cross member 5 in a widthwise direction thereof, so as to be located at the center of the vehicle widthwise direction when attached to the rear of the vehicle body.

The hitch ball support 6 has a stay 6a extending downward from the center of the cross member 5, and a hitch arm 6b protruding rearward from the bottom of the stay 6a. A hitch ball support shaft 6c, onto which a hitch ball 6d is fixedly installed, is provided upright at a rear end of the hitch arm 6b. Note that the rear end of the hitch arm 6b that supports the hitch ball 6d protrudes from the rear of the vehicle body.

Figure 3:
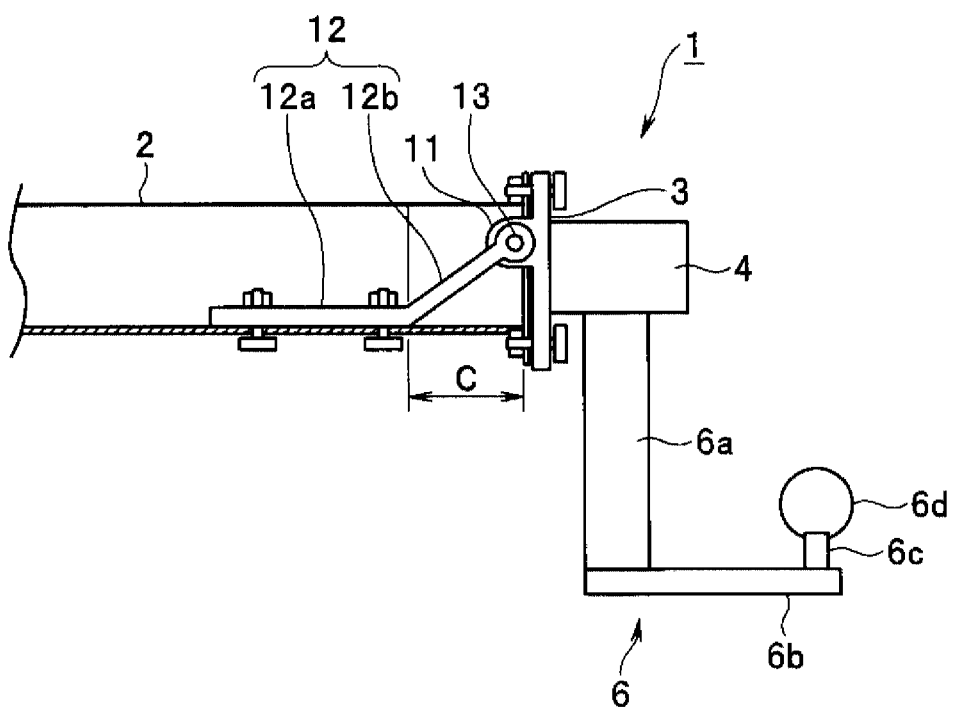
FIG. 3 is a schematic side view of the trailer hitch.

As illustrated in FIGS. 2 and 3, hinge brackets 11 are each provided horizontally in a protruding manner on a front surface of each fixed plate 3, and a fixed bracket 12 is connected with each hinge bracket 11. The fixed bracket 12 has a main body 12a and a hinge arm 12b that serves as the arm of the present invention in the first example and extends while inclining upward from a rear end of the main body 12a. The hinge bracket 11 is pivotally supported on an upper end of the hinge arm 12b by a hinge pin 13 so as to swing freely in the longitudinal direction of the vehicle body. The hinge bracket 11, fixed bracket 12, and hinge pin 13 are rigid enough that they are not deformed by an impact load that collapses the EA region C.

Figure 4:
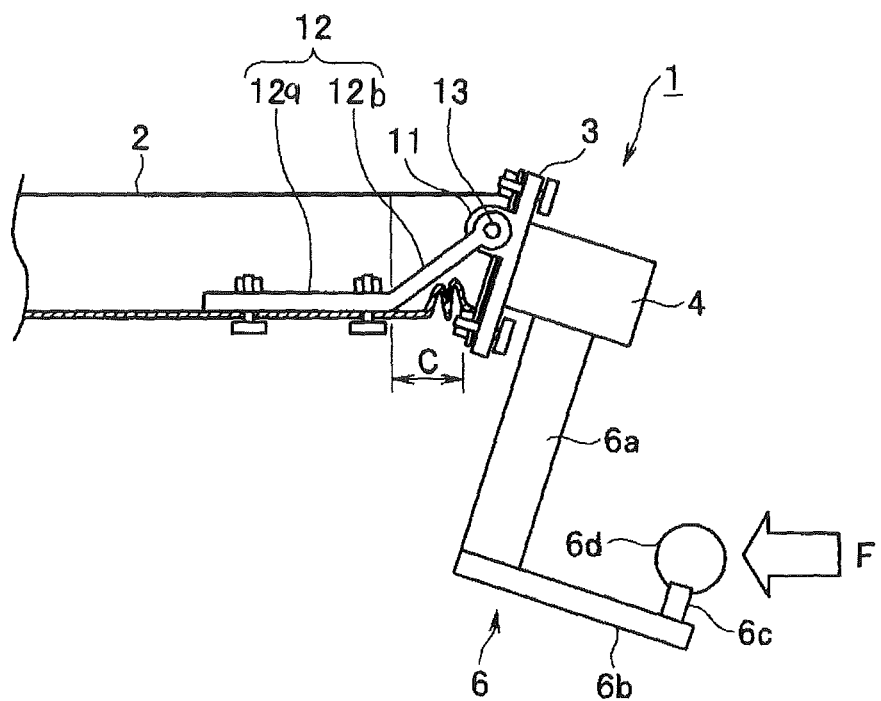
FIG. 4 is a schematic side view equivalent to FIG. 3, illustrating a result of a rear end collision.

The main body 12a of the fixed bracket 12 is tightly fixed to the internal bottom of the rear side frame 2 by a bolt. The above-mentioned EA region C is set within a region where the hinge arm 12b of the fixed bracket 12 extends. In other words, the horizontal length of the hinge arm 12b is set in accordance with the preset EA region C. Also, as illustrated in FIG. 4, a height h from the axial center of the hinge pin 13 that pivotally supports the hinge bracket 11 and hinge arm 12b to the bottom of the fixed bracket 12 is set at an offset height from a bottom surface of the rear side frame so that the EA region C can be collapsed sufficiently by rotating about the hinge pin 13 when an impact load F of a rear end collision is applied to the hitch arm 6b of the trailer hitch 1.

Next is described a reaction of the trailer hitch 1 of the foregoing structure to a rear end collision. A rear of the hitch arm 6b of the hitch ball support 6 of the trailer hitch 1 protrudes from the center of the rear of the vehicle body in the vehicle widthwise direction, and the hitch ball 6d is provided upright at the rear end of the hitch arm 6b, as illustrated in FIGS. 1 and 2.

The hitch arm 6b is offset downward with respect to the fixed plates 3 that fixedly install the both ends of the cross member 5 by means of the support brackets 4. Therefore, when the impact load F is applied from behind to the rear end of the hitch arm 6b, a load acts on the rear end of the hitch arm 6b to cause the hitch arm 6b to swing obliquely downward as well as toward the front of the vehicle body.

At this point, a load that pushes each fixed plate 3 downward occurs. In this case, the hinge bracket 11 formed on the front surface of the fixed plate 3 is supported at the tip end of the hinge arm 12b by the hinge pin 13, the hinge arm 12b extending rearward from the main body 12a of the fixed bracket 12 fixed to the bottom surface of the rear side frame 2. For this reason, a rotational moment is generated in the fixed plate 3 around the hinge pin 13 that is offset upward by the height h from the bottom surface of the rear side frame 2. As a result, a clockwise moment load illustrated in FIG. 4 is generated in the support bracket 4 connected with the fixed plate 3, the cross member 5, and the hitch ball support 6.

Then, in the EA region C that is provided in the rear of each rear side frame 2, a rearward tensile load is generated in the upper portion and a forward compression load is generated in the lower portion with the hinge pin 13 as a fulcrum, by the above-mentioned rotational moment. As a result, the upper portion of the EA region C is bent toward a rear end surface thereof, and the flange that fastens and fixes the fixed plate 3 is bent rearward, whereby the lower portion is collapsed to absorb the impact load. Accordingly, a large bending moment in the entire rear side frame 2 is prevented and the rear side frame 2 is prevented from being bent and deformed at a point in front of the EA region C.

In the first example, the fixed plate 3 of the trailer hitch 1 that is fixedly installed to the rear end surface of the rear side frame 2 is supported by the hinge pin 13 at the hinge bracket 11 at the predetermined height h from the bottom surface of the rear side frame 2, the hinge bracket 11 being formed on the front surface of the fixed plate 3. Therefore, even when an impact load of a rear end collision is applied to the rear end of the hitch arm 6b, the rotational moment of the fixed plate 3 can efficiently absorb the impact by collapsing the EA region C, preventing the rear side frame 2 from being bent and deformed at a point in front of the EA region C.

In addition, the impact of a rear end collision can be absorbed with a short span in the rear of the rear side frame 2. Therefore, even in a vehicle such as an engine/electric hybrid vehicle or an electric vehicle in which a solid and relatively heavy battery module and the like are installed under the rear panel between the rear side frames 2, these components can be effectively be protected without damage.

Second Example

Figure 5:
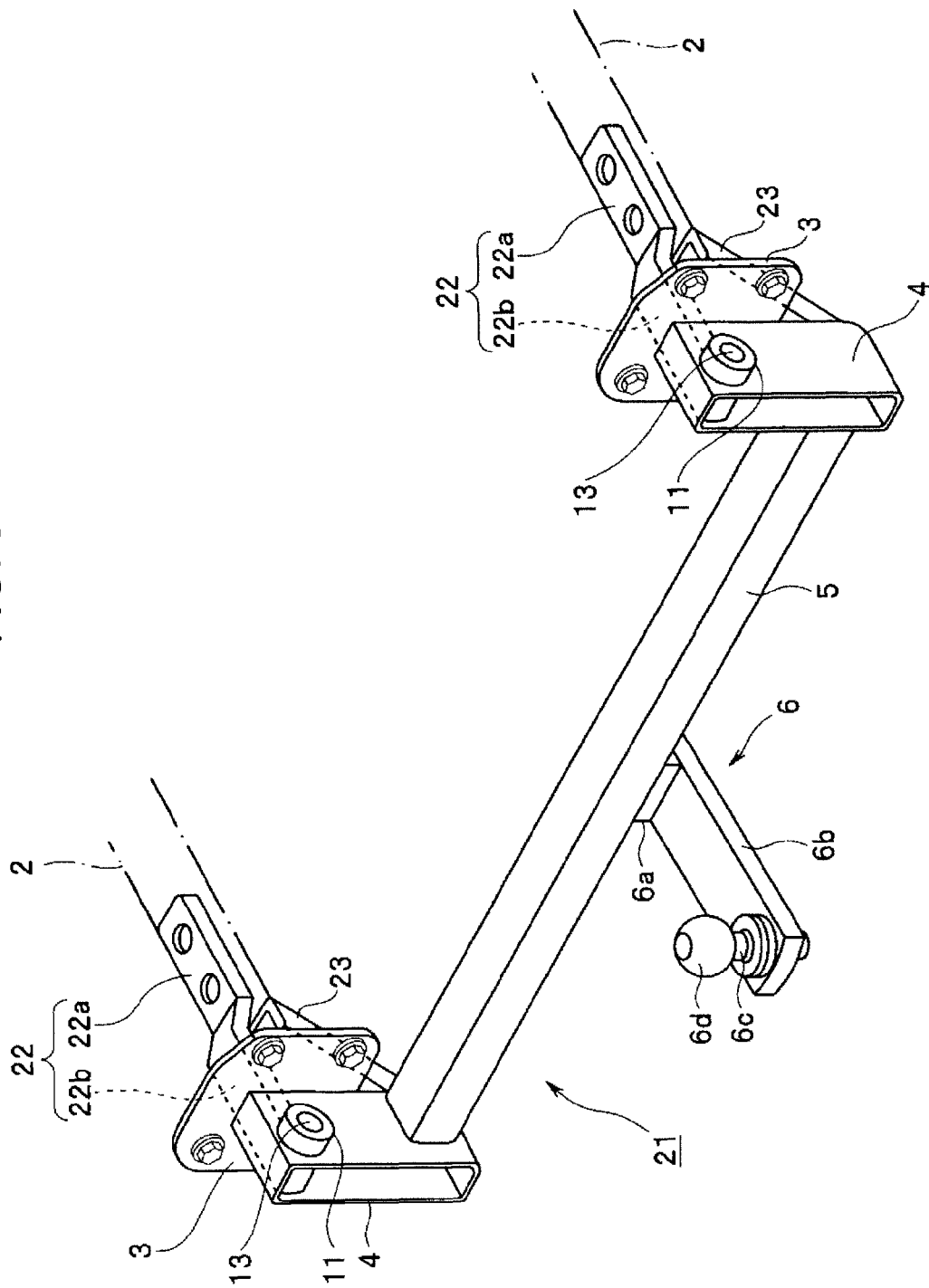
FIG. 5 is a perspective view of a trailer hitch according to a second example.

A second example of the present invention will be described with reference to FIGS. 5 to 7. In the first example described above, the EA region C is set at the axial rear end of each rear side frame 2 to absorb an impact. A trailer hitch 21 according to the second example, on the other hand, has an EA stay 23 disposed outside each rear side frame 2 so that an impact can be absorbed by collapsing the EA stay 23. In the description of the second example, components that are substantially similar to those in the first example are denoted by like reference numerals and descriptions thereof are omitted.

Specifically, in the second example, the support brackets 4, which are fixedly installed to the rear surfaces of the fixed plates 3 fixed to the rear ends of the rear side frames 2, extend downward below lower ends of the fixed plates 3, and each of the EA stays 23 is disposed and fixed obliquely between a front surface lower portion of the fixed plate 3 and a rear portion lower surface of the rear side frame 2.

Each fixed bracket 22 that fixes a main body 22a to the bottom surface of the rear end of the rear side frame 2 is formed substantially into a crank in which a hinge arm 22b extending rearward is offset to be above the main body 22a. The rear end of the hinge arm 22b passes through the fixed plate 3 to protrude to the inside of the support bracket 4 that is formed into a cylinder having a rectangular cross section.

Figure 6:
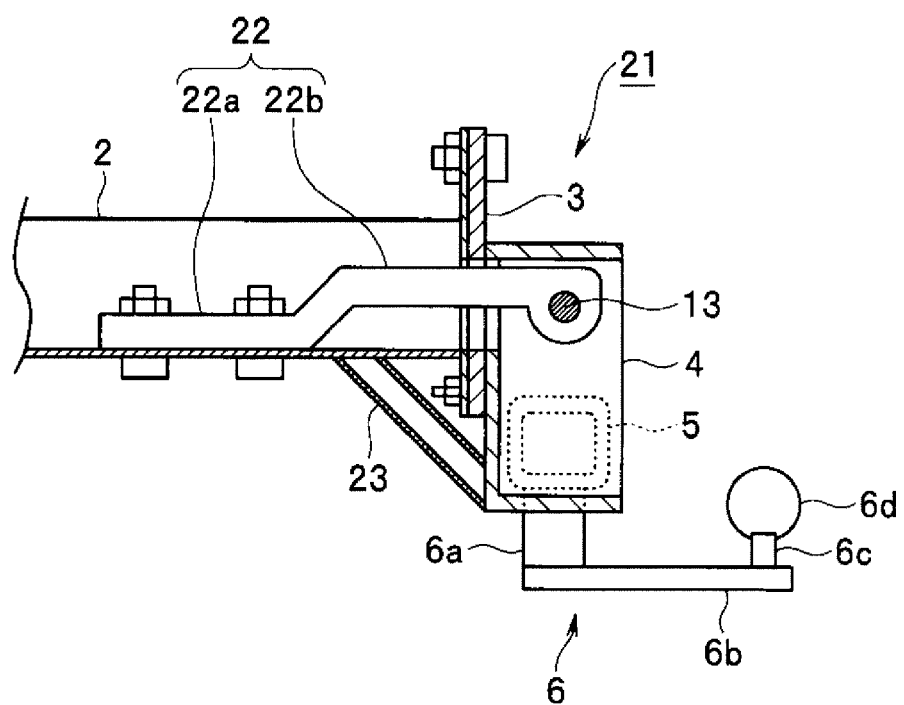
FIG. 6 is a cross-sectional side view of the trailer hitch.

The hinge brackets 11 are fixedly installed at upper portions of the support brackets 4 respectively (see FIG. 5), in which tip ends of the support brackets 4 are supported by the respective hinge brackets 11 so as to be able to pivot about the hinge pins 13, as illustrated in FIG. 6. Furthermore, the cross member 5 having the hitch ball support 6 fixedly installed in the middle connects the opposing lower surfaces of the support brackets 4 to each other.

According to this configuration, when the impact load F is applied from behind to the rear end of the hitch arm 6b, a load acts on the rear end of the hitch arm 6b to cause the hitch arm 6b to swing obliquely downward and toward the front of the vehicle body, and this swinging load is transmitted through the cross member 5 to the support brackets 4 that are fixedly installed to the ends of the cross member 5.

Figure 7:
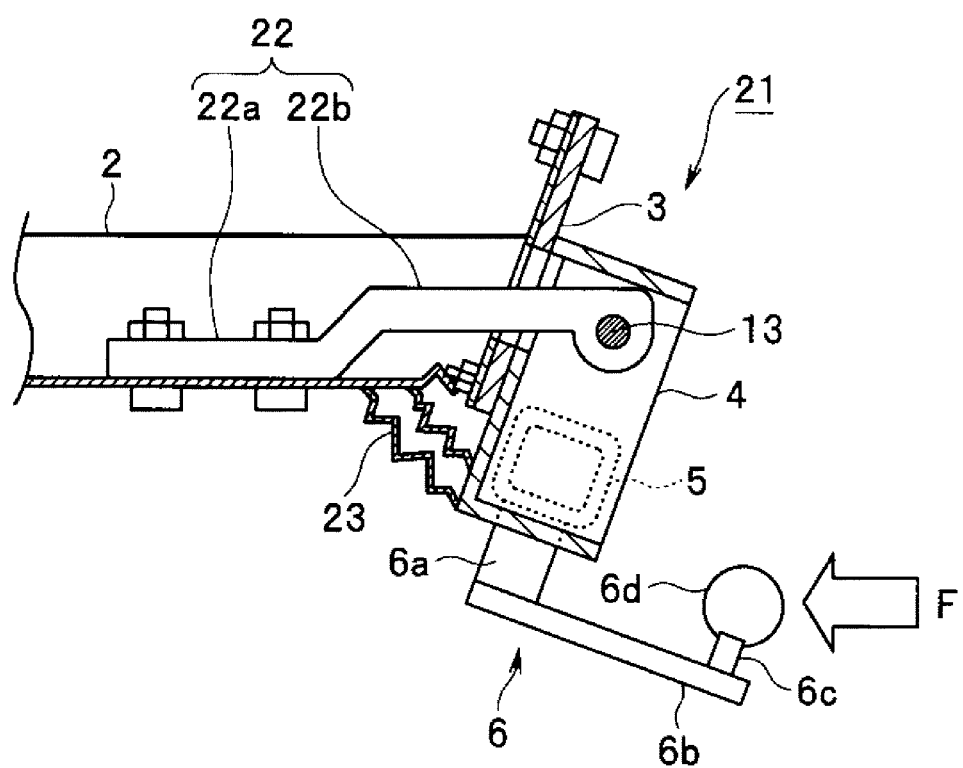
FIG. 7 is a cross-sectional side view equivalent to FIG. 6, illustrating a result of a rear end collision.

Consequently, as illustrated in FIG. 7, each support bracket 4 rotates about the hinge pin 13 in the clockwise direction as viewed in the page space of the same diagram, pressing, substantially in the axial direction, the EA stay 23 that connects the entire lower portion of the support bracket 4 and the bottom of the rear side frame 2 to each other. The hinge pin 13 supports the support bracket 4 at the position that protrudes rearward behind the rear end of the EA stay 23. For this reason, a stroke (EA stroke) that is enough to collapse and deform the EA stay 23 can be secured. As a result, the impact load F can be absorbed efficiently.

Because in the second example the impact of the impact load F is absorbed by collapsing and deforming the EA stays 23, the EA stays 23 can easily be added on to the existing rear side frames 2, realizing high versatility in addition to the effects of the first example described above. Furthermore, the EA stroke can be set by the externally attached EA stays 23, thereby increasing the degree of design freedom and exerting more precise impact absorption capability.

Third Example

Figure 8:
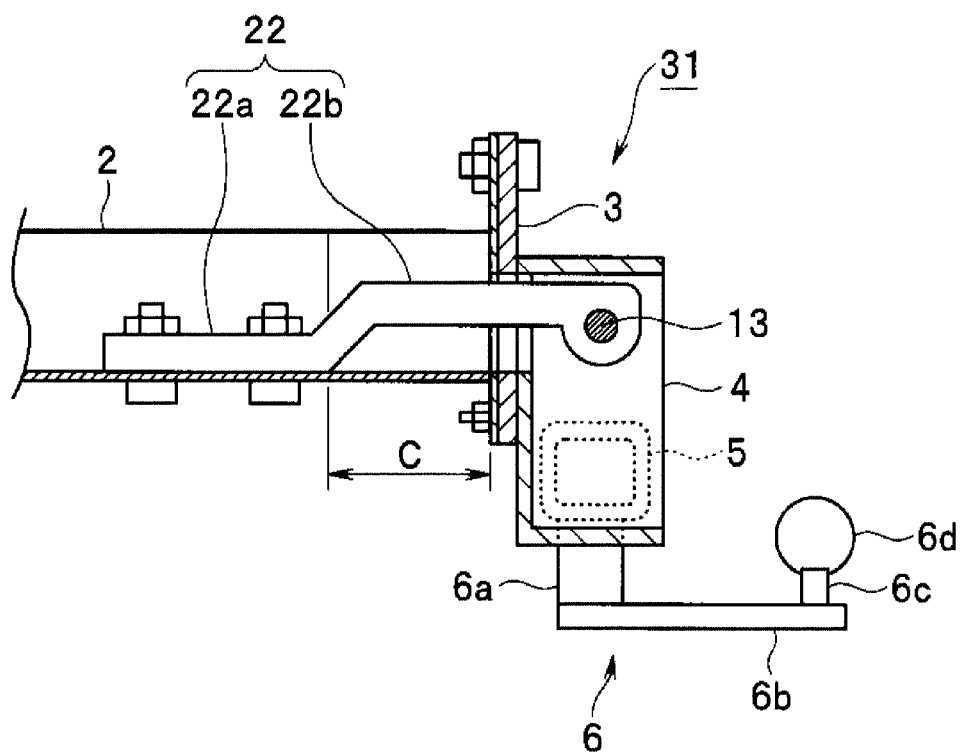
FIG. 8 is a cross-sectional side view of a trailer hitch according to a third example.

A third example of the present invention will be described with reference to FIGS. 8 and 9. In the second example described above, the impact load F is absorbed mainly by collapsing and deforming the external EA stays 23. A trailer hitch 31 according to the third example, on the other hand, has each EA region C set between the main body 22a of the fixed bracket 22 and the rear end of the rear side frame 2. Therefore, the present example does not require the EA stays 23. As with the first example described above, the EA region is formed by using an extension (EA member) or machining each rear side frame 2 itself.

In this configuration, when the impact load F is applied from behind to the rear end of the hitch arm 6b, a load acts on the rear end of the hitch arm 6b to cause the hitch arm 6b to swing obliquely downward, and toward the front of the vehicle body, and this swinging load is transmitted through the cross member 5 to the support brackets 4 that are fixedly installed to the ends of the cross member 5.

Figure 9:
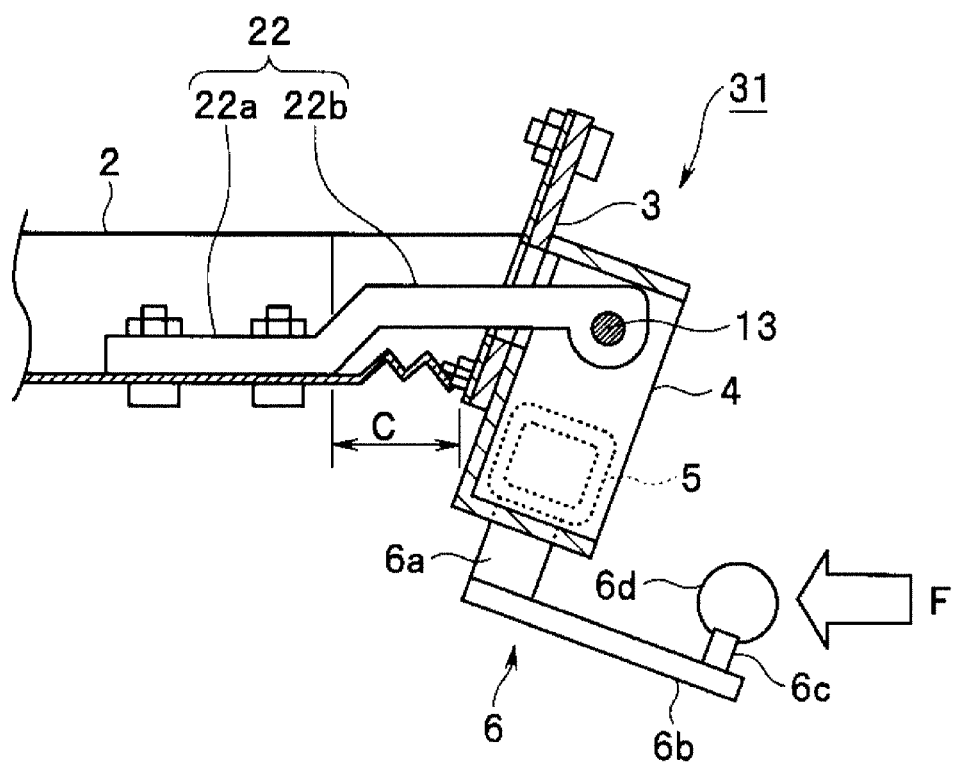
FIG. 9 is a cross-sectional side view equivalent to FIG. 6, illustrating a result of a rear end collision.

Consequently, as illustrate in FIG. 9, each support bracket 4 rotates about the hinge pin 13 in the clockwise direction as viewed in the page space of the same diagram, causing the support bracket 4 to collapse and deform the bottom of the rear side frame 2. The impact load F is absorbed by this collapse and deformation of the bottom of the rear side frame 2.

In the third example, the hinge pin 13 supports the support bracket 4 at the position that protrudes rearward behind the rear end of the EA region C. For this reason, unlike the first example, a stroke that is enough to collapse and deform the EA region C (EA stroke) can be secured, eliminating the need to provide the EA stays 23. As a result, a structure that is more simplified than the one described in the second example can be realized.

Note that the present invention is not limited to the foregoing examples. For instance, in each of the examples, each of the fixed plates 3 may be connected to the hinge arm 12b (or 22b) by a load regulating member that allows the fixed plate 3 to swing. The load regulating member is, for example, a shear pin which is crushed and thereby causes the fixed plate 3 to swing when a load equal to or greater than a preset load acts thereon. Therefore, when, for example, a sudden brake is applied and an inertial load is received from a target to be pulled, the support brackets 4 are prevented from swinging easily, realizing high durability and reliability. In this case, the hinge bracket 11 and the hinge arm 12b (or 22b) may be caulked with the hinge pin 13 in pace of the shear pin to enable the swinging motion at a load equal to or greater than a predetermined load.

The invention claimed is:

1. A trailer hitch structure, comprising:
   a rear frame disposed on each side of a vehicle body in a widthwise direction and extending in a longitudinal direction of the vehicle body; and
   a trailer hitch that is connected to the rear frames and has a pair of fixed members fixed to the rear frames, a cross member connecting the fixed members to each other, and a hitch support fixed to the cross member,
   wherein a fixed bracket is provided in a rear portion of each of the rear frames in a fixed manner, wherein the fixed brackets support the respective fixed members in such a manner that the fixed members swing freely in the longitudinal direction of the vehicle body, wherein each of the fixed brackets has a main body fixed to a bottom of the corresponding rear frame and a hinge arm extending rearward and supporting the corresponding fixed member while being offset upward with respect to the main body, and wherein a lower portion of each of the hinge arms is set as an impact absorbing region.

2. The trailer hitch structure according to claim 1, wherein the impact absorbing region is set in each of the rear frame.

3. The trailer hitch structure according to claim 1, wherein an impact absorbing stay that connects a lower portion of each of the fixed members and the bottom of the corresponding rear frame to each other is set as the impact absorbing region.

4. The trailer hitch structure according to claim 1, wherein each of the fixed members is connected to the corresponding fixed bracket by a load regulating member that allows the fixed member to swing at a load equal to or greater than a predetermined load.

5. The trailer hitch structure according to claim 2, wherein each of the fixed members is connected to the corresponding fixed bracket by a load regulating member that allows the fixed member to swing at a load equal to or greater than a predetermined load.

6. The trailer hitch structure according to claim 3, wherein each of the fixed members is connected to the corresponding fixed bracket by a load regulating member that allows the fixed member to swing at a load equal to or greater than a predetermined load.

7. A trailer hitch structure, comprising:
a rear frame disposed on each side of a vehicle body in a widthwise direction and extending in a longitudinal direction of the vehicle body; and
a trailer hitch that is connected to the rear frames and has a pair of fixed members fixed to the rear frames, a cross member connecting the fixed members to each other, and a hitch support fixed to the cross member, wherein a fixed bracket is provided in a rear portion of each of the rear frames in a fixed manner, and the fixed brackets support the respective fixed members in such a manner that the fixed members swing freely in the longitudinal direction of the vehicle body, wherein each of the fixed brackets includes a hinge arm extending rearward and supporting the corresponding fixed member, and a lower portion of each of the hinge arms is set as an impact absorbing region.

8. The trailer hitch structure according to claim 7, wherein the impact absorbing region is set in each of the rear frames.

9. The trailer hitch structure according to claim 7, wherein an impact absorbing stay that connects a lower portion of each of the fixed members and a bottom of the corresponding rear frame to each other is set as the impact absorbing region.

10. The trailer hitch structure according to claim 7, wherein each of the fixed members is connected to the corresponding fixed bracket by a load regulating member that allows the fixed member to swing at a load equal to or greater than a predetermined load.

11. The trailer hitch structure according to claim 8, wherein each of the fixed members is connected to the corresponding fixed bracket by a load regulating member that allows the fixed member to swing at a load equal to or greater than a predetermined load.

12. The trailer hitch structure according to claim 9, wherein each of the fixed members is connected to the corresponding fixed bracket by a load regulating member that allows the fixed member to swing at a load equal to or greater than a predetermined load.

* * * * *